(12) United States Patent
Stiehl

(10) Patent No.: US 8,167,126 B2
(45) Date of Patent: May 1, 2012

(54) BUTTON MECHANISMS FOR ELECTRONIC DEVICE CASES

(75) Inventor: Kurt Stiehl, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/569,874

(22) Filed: Sep. 29, 2009

(65) Prior Publication Data

US 2011/0073505 A1   Mar. 31, 2011

(51) Int. Cl.
*B65D 85/38* (2006.01)
*B65D 85/00* (2006.01)

(52) U.S. Cl. ....................... 206/320; 206/305

(58) Field of Classification Search ................ 150/165; 200/255, 282, 283, 315, 329–331, 339, 333, 200/43.13, 510, 553, 557; 206/320, 305; 248/176.1, 309.1; 361/379.01, 679.02, 679.55, 361/679.56, 679.58
See application file for complete search history.

(56) References Cited

U.S. PATENT DOCUMENTS

| | | | | |
|---|---|---|---|---|
| 4,025,930 A | * | 5/1977 | Wolff | 396/29 |
| 4,152,889 A | * | 5/1979 | Sekiguchi | 368/290 |
| 4,443,935 A | * | 4/1984 | Zamba et al. | 29/622 |
| 5,378,862 A | * | 1/1995 | Tasaka et al. | 200/6 A |
| 5,422,783 A | * | 6/1995 | Darbee | 361/679.08 |
| 5,514,843 A | * | 5/1996 | Wilfong et al. | 200/5 R |
| 5,629,836 A | * | 5/1997 | Wright | 361/755 |
| 5,654,846 A | | 8/1997 | Wicks et al. | |
| 6,002,093 A | | 12/1999 | Hrehor, Jr. et al. | |
| 6,556,786 B2 | * | 4/2003 | Taguchi et al. | 396/85 |
| 6,789,206 B1 | | 9/2004 | Wierzbicki et al. | |
| 7,050,712 B2 | * | 5/2006 | Shimamura | 396/27 |
| 7,352,961 B2 | * | 4/2008 | Watanabe et al. | 396/27 |
| 7,381,914 B1 | | 6/2008 | Plesko et al. | |
| 7,613,386 B2 | * | 11/2009 | Shimamura | 396/27 |
| 2001/0050884 A1 | * | 12/2001 | Wyssbrod | 368/321 |
| 2002/0023827 A1 | * | 2/2002 | Tsuda et al. | 200/4 |
| 2004/0182247 A1 | * | 9/2004 | Guerrero | 99/275 |
| 2004/0208015 A1 | * | 10/2004 | Boddy et al. | 362/494 |
| 2005/0167304 A1 | * | 8/2005 | Shimamura | 206/316.2 |
| 2008/0245876 A1 | * | 10/2008 | Gordon et al. | 235/490 |

FOREIGN PATENT DOCUMENTS

EP   1 677 307 A2   7/2006

* cited by examiner

*Primary Examiner* — J. Gregory Pickett
*Assistant Examiner* — Kaushikkumar Desai
(74) *Attorney, Agent, or Firm* — Treyz Law Group; David C. Kellogg; G. Victor Treyz

(57) ABSTRACT

A case for electronic devices having buttons may include button mechanisms that allow the case slide over an electronic device without impacting the buttons. Each button mechanism may include a sheet spring that biases the button mechanism away from the buttons. When a user presses the button mechanism, the button mechanism may transmit force from the user to one of the buttons and actuate that button. One type of button mechanism may transmit force that actuates a single push-button. A second type of button mechanism may transmit forces that actuate a rocker switch with two actuation modes such as a volume rocker with a volume up mode and a volume down mode. The button mechanisms may be configured to provide tactile feedback to the user that is similar to the tactile feedback of the electronic device's buttons when the electronic device is not mounted in the case.

20 Claims, 10 Drawing Sheets

BUTTON MECHANISMS FOR ELECTRONIC DEVICE CASES

BACKGROUND

This invention relates to removable cases for portable electronic devices and, more particularly, to button mechanisms for removable cases.

Portable electronic devices and removable cases for the portable electronic devices are becoming increasingly popular. Examples of portable electronic devices include handheld computers, cellular telephone, media players, and hybrid devices that include the functionality of multiple devices of this type. Removable cases for portable electronic devices have been used for multiple purposes such as protecting the devices from dirt and physical damage and enhancing the physical appearance of the device.

Conventional cases for portable electronic devices have used various structures for providing users with access to buttons on the devices. As one example, holes in the cases have been used to provide users with direct access to buttons on the devices. These holes have occasionally been covered with soft membranes.

In some cases, such as water-resistant cases, sealed structures with a coil-spring-loaded piston in a sealed cylinder have provided users with indirect access to buttons on the devices. With a conventional case of this type, the structures that provide indirect access to buttons on a device are large and are incapable of mimicking the feedback that the buttons of the device would provide if the device were not mounted in the case.

It would therefore be desirable to be able to provide improved button mechanisms for cases for portable electronic devices.

SUMMARY

Removable cases for electronic devices such as handheld electronic devices may have button mechanisms. A case for an electronic device may be configured to hold the electronic device. As one example, the case may be configured such that the electronic device is mounted within the case by sliding the electronic device into the case. The case may protect the electronic device from dirt and damage and may serve to enhance and/or mimic the aesthetics of the electronic device. The electronic device may have buttons and the case may have button mechanisms that interface with the electronic device's buttons. If desired, the button mechanisms may be configured to match or enhance the feedback provided by the electronic device's buttons.

The case may be relatively form-fitting to the electronic device and the button mechanisms may have a relatively low-profile. Low profile button mechanisms may facilitate mounting the electronic device within a form-fitting case without the button mechanisms in the case and the buttons on the electronic device impacting each other and potentially causing damage. Alternatively or in addition, the button mechanisms may be spring-loaded such that the button mechanisms are generally out of the way of the electronic device's buttons when the electronic device is being mounted within the case. The button mechanism may be spring-loaded using one or more sheet springs (as an example).

Each button mechanism may include a retaining plate and an external plate. The plates may include matching press-fit members that are pressed together during assembly. If desired, the plates may be held together using adhesive and/or fasteners (as examples).

One type of button mechanism may be configured to transmit force from a user to actuate a push-button with a single actuation mode. Another type of button mechanism may be configured to transmit forces from a user for actuation of a rocker-type switch with two actuation modes. One example of a rocker-type switch is a volume switch with a first portion that is depressed to increase a volume and a second portion that is depressed to decrease the volume. If desired, rocker-type switches may be formed from two push-button-type switches.

Further features of the invention, its nature and various advantages will be more apparent from the accompanying drawings and the following detailed description of the preferred embodiments.

DETAILED DESCRIPTION

Figure 1:
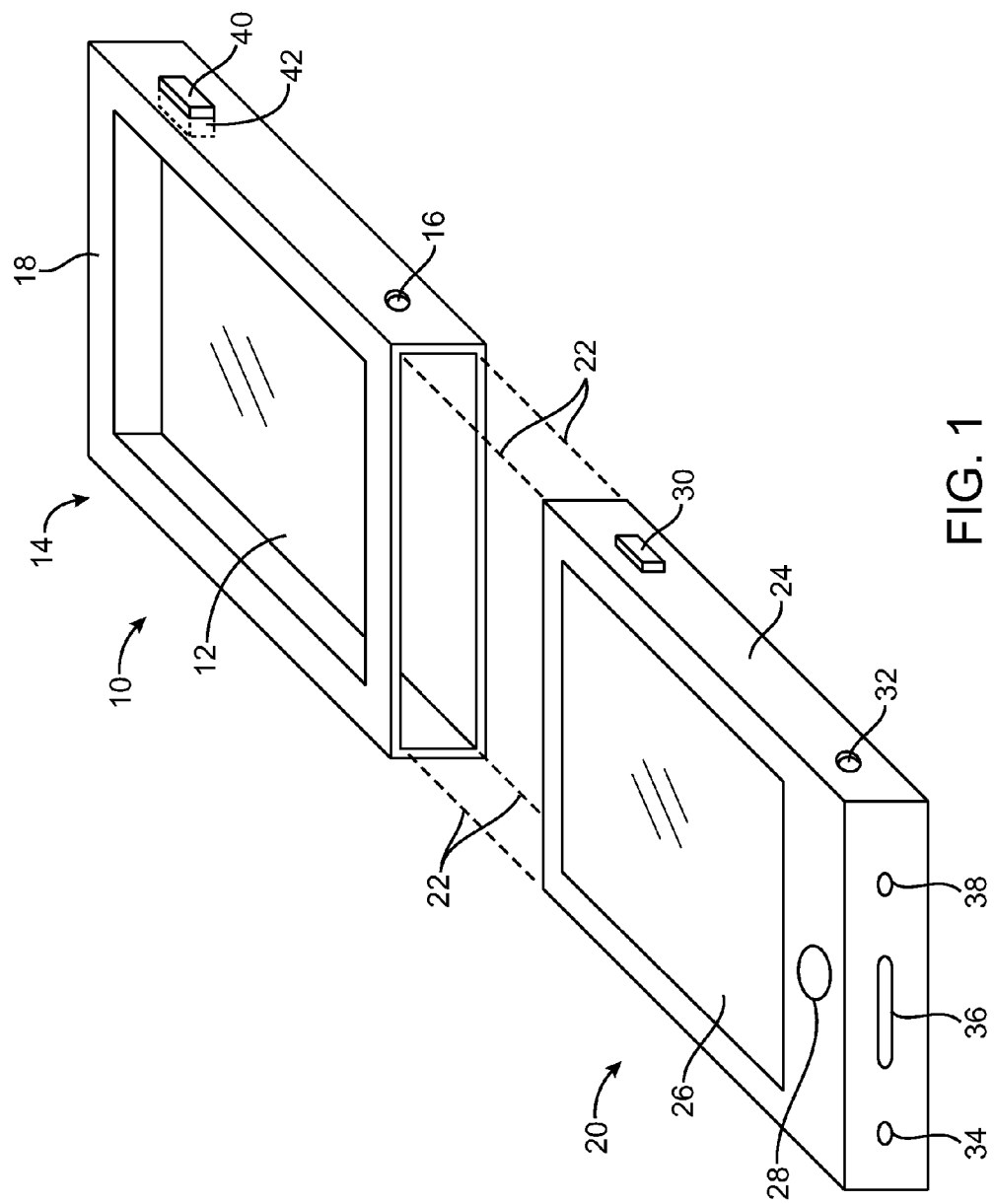
FIG. 1 is a perspective view of an illustrative removable case for an electronic device showing how the electronic device may slide into the case in accordance with an embodiment of the present invention.

The present invention relates generally to removable cases for electronic devices and, more particularly, to button mechanisms for removable cases for portable electronic devices. A case may be designed to fit closely around an electronic device (e.g., the case may be form-fitting). As one example, the electronic device may slide into the case with minimal clearance for buttons and other features that protrude from the device. In order to facilitate sliding the device into the case and also to avoid damaging protruding features such as buttons, the button mechanisms and other features in the case may have relatively low profiles and may be biased away from the electronic device using a spring such as a thin sheet spring (e.g., a planar spring member which may be stamped from a sheet of metal or otherwise formed from suitable spring material). When viewed from the front, the sheet spring may have a ring-like shape. When view edgewise, the sheet spring may have a "U" like shape, a "V" like shape, a "W" like shape, etc.

The case for an electronic device may be a sliding-type case that slides over the electronic device. As another example, the case may be a snap-on case with flexible portions that wrap around portions of the electronic device. Combinations of these and other designs are also possible. For example, the case may include a first portion that slides over a first portion of the electronic device and a second portion that then snaps over a second portion of the electronic device. With other suitable arrangements, the case may include structures such as a Velcro® and/or straps to hold the electronic device in the case. These are merely illustrative examples of how the case may be configured to hold an electronic device.

The electronic devices held by the case may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, which is sometimes described herein as an example, the portable electronic devices are handheld electronic devices. Handheld devices may be, for example, cellular telephones, media players with wireless communications capabilities, handheld computers (also sometimes called personal digital assistants), remote controllers, global positioning system (GPS) devices, and handheld gaming devices. The handheld devices may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, and supports web browsing. These are merely illustrative examples.

An illustrative case and an electronic device that mates with the case are shown in FIG. 1. As shown by lines 22 in FIG. 1, electronic device 20 may slide into case 10. As examples, device 20 may include housing 24, display 26, buttons such as buttons 28 and 30, and communications ports such as ports 34, 36, and 38 and audio jack 32 (e.g., for audio and/or video). With one arrangement, ports 34 and 38 may form microphone and speaker ports and port 36 may contain a 30-pin data connector.

In general, device 20 can include any desired components and, if desired, case 10 may have features that facilitate the use of the components of device 20. For example, case 10 may include back face 12 and an open front face such as front face 14 (e.g., defined by an opening in case 10 as shown in the FIG. 1 example). Front face 14 may facilitate the use of display 26, button 28, and other components in device 20, when device 20 is mated to case 10. As another example, case 10 may have a hole such as hole 16 that provides direct access to a component in device 20 such as audio jack 32 (e.g., a hole that allows an audio plug from an external accessory to pass through case 10 and be inserted into jack 32).

Case 10 may be formed from any suitable materials. If desired, case 10 may be formed from a housing such as housing 18. Housing 18 may be formed from a single unitary structure. If desired, housing 18 may be formed from multiple structures held together by fasteners. Housing 18 and case 10 may be formed from any suitable material. Examples of materials that housing 18 may be formed from include rigid plastics, semi-rigid plastics, flexible plastics, non-plastic materials, etc. If desired, housing 18 and case 10 may be formed from rigid materials such as metals, ceramics, composites, glass, etc.

Case 10 may have one or more button mechanisms such as button mechanism 40 that are associated with buttons on electronic device 20 such as button 30. When device 20 is inside case 10, button mechanism 40 may align with button 30 of device 20. With this type of arrangement, a user may press button mechanism 40 and thereby depress button mechanism 40 to position 42. When button mechanism 40 is moved into position 42 in this way, button mechanism 40 may bear against and depress button 30 of device 20 (e.g., button mechanism 40 may depress button 30 in a manner similar to how a user could press button 30 if device 20 were not mounted within case 10).

Optionally, button mechanism 40 may be configured to mimic the feedback provided to a user by button 30 of device 20. For example, button mechanism 40 may be configured to provide a look and feel (such as a certain resistance, a click or detente during engagement of the button, and other feedback) that matches the look and feel of button 30 when device 20 is not mounted within case 10.

Button mechanism 40 may facilitate the insertion of electronic device 20 into case 10. For example, button mechanism 40 may include a spring that biases mechanism 40 away from position 42 (e.g., a spring that biases the mechanism into its un-depressed position illustrated in FIG. 1). With this type of arrangement, button 30 and other protruding components of device 20 may be less likely to scrape against or otherwise catch on button mechanism 40 as device 20 is being inserted into case 10.

Figure 2:
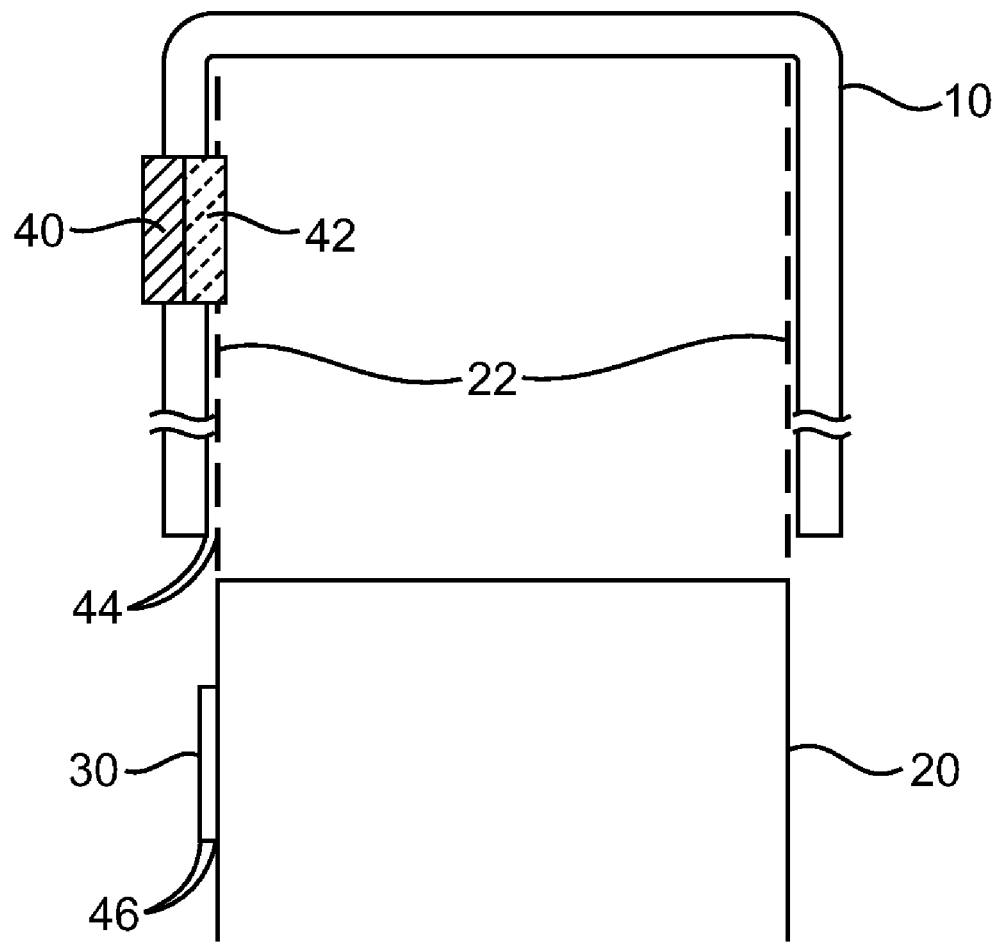
FIG. 2 is a cross-sectional top view of an illustrative case that may hold an electronic device and that may have a button mechanism that is biased away from the electronic device as the electronic device slides into the case in accordance with an embodiment of the present invention.

An example of how button mechanism 40 may facilitate the insertion of electronic device 20 into case 10 is illustrated in FIG. 2. As shown in FIG. 2, as device 20 slides into case 10 along direction 22, there may be a relatively small gap such as gap 44 between the exterior edge of device 20 and the interior of case 10. In addition, button 30 may have a height above the exterior edge of device 20 such as height 46. In general, gap 44 and height 46 may be any suitable sizes. As examples, gap 44 may be 0.1 mm or less and height 46 may be 0.5 mm or less. In general, it is possible for gap 44 to be less than height 46 in embodiments in which case 20 is formed from flexible or semi-flexible materials.

As illustrated by FIG. 2, if button mechanism 40 were depressed and in position 42, button mechanism 40 could potentially interfere with the insertion of device 20 into case 10 (e.g., by presenting a physical obstacle in the path of device 20 and in the path of button 30 of device 20). However, since button mechanism 40 may include a biasing member that biases the mechanism away from position 42 (i.e., away from the interior of case 10), button mechanism 40 will generally not be in position 42 when device 20 is being inserted into case 10. This type of arrangement facilitates the use of cases such as case 10 that have a relatively close form-fit with the associated electronic device 20 that the case is configured to hold.

Figure 3:
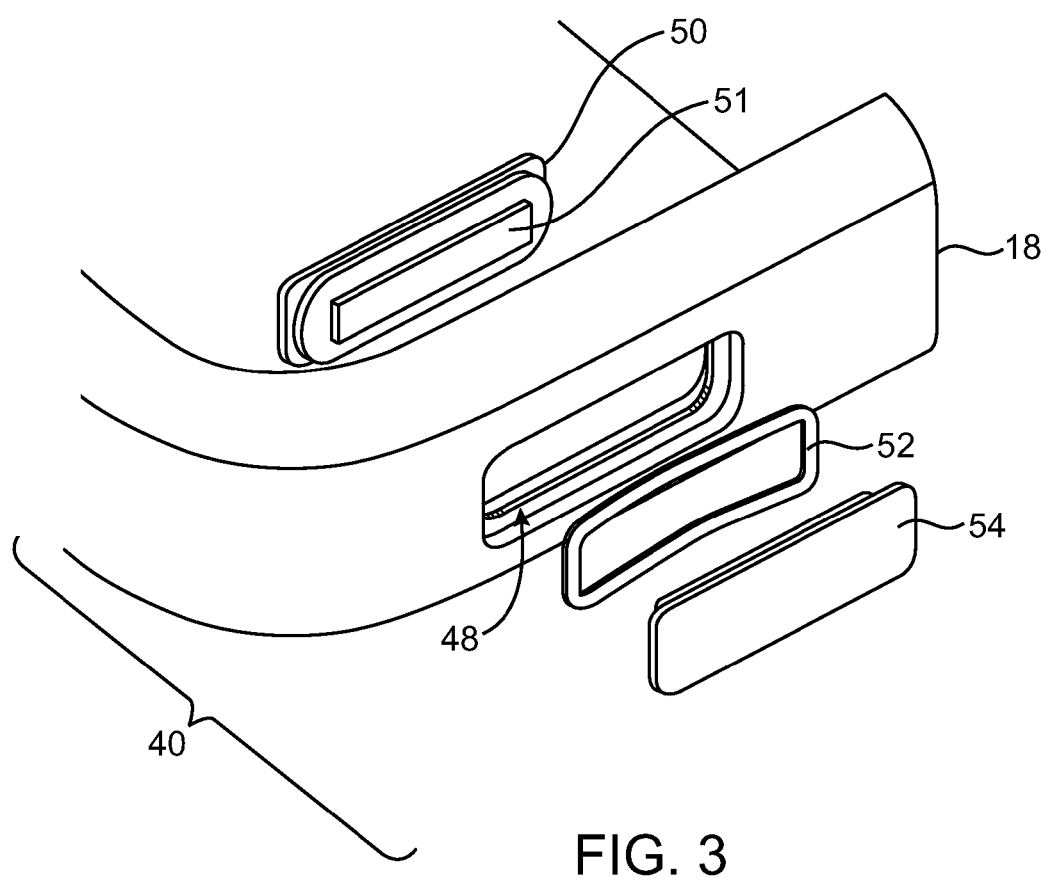
FIG. 3 is an exploded perspective view of an illustrative portion of a case that may hold an electronic device and a button mechanism that may be part of the case in accordance with an embodiment of the present invention.

An exploded perspective view of button mechanism 40 and a portion of housing 18 in case 10 in which button mechanism 40 may be provided is shown in FIG. 3. Button mechanism 40 may pass through hole 48 of housing 18 (as one example). As shown in FIG. 3, button mechanism 40 may include retaining plate 50, spring 52, and external plate 54. Retaining plate 50, spring 52, and external plate 54 may be sandwiched together such that button mechanism 40 can move within hole 48 of housing 18 and a user can use button mechanism 40 to actuate one or more buttons adjacent to hole (e.g., buttons on an electronic device such as device 20 of FIG. 1). External plate 54 may sometimes be referred to as an external surface or an external member and retaining plate 50 may sometimes be referred to as a retaining member.

Retaining plate 50 and external plate 54 may be formed from any suitable materials. As examples, plate 50 and plate 54 may be formed from rigid plastics, semi-rigid plastics, flexible plastics, non-plastic materials, etc. If desired, retaining plate 50 and external plate 54 may be formed from metals such as stainless steel. With one suitable arrangement, external plate 54 may be formed from the same material as button 30 and may have a finish that is similar to the finish of button 30. With this type of arrangement, the aesthetics of device 20 when mounted in case 10 may more closely match the aesthetics of device 20 when the device is not mounted in case 10.

Button mechanism 40 may be held together by connecting plates 50 and 54. As examples, retaining plate 50 and external plate 54 may be held together using screws or other fasteners, welds, adhesives, etc. With one suitable arrangement, retaining plate 50 and external plate 54 may have mating press-fit engagement features that lock retaining plate 50 and external plate 54 together when plate 50 and plate 54 are pressed together during assembly. FIG. 3 illustrates an example of this type of mating press-fit arrangement in which retaining plate 50 includes extending male press-fit member 51. External plate 54 may include a corresponding female press-fit member (not shown in FIG. 3). Alternatively, retaining plate 50 may be provided with a female press-fit member and external plate 54 can be simultaneously provided with a male press-fit member. Combinations of these arrangements can also be used, if desired.

Spring 52 may provide a preload force in button mechanism 40 (e.g., bias button mechanism 40 outward and away from position 42 of FIG. 1). With one suitable arrangement, spring 52 may bear against housing 18 (e.g., a lip on housing 18 adjacent to hole 48) and may bear against external plate 54. As shown in FIG. 3, spring 52 may be formed from a ring-shaped sheet of spring material (i.e., a sheet spring). In general, however, spring 52 may be formed from any suitable type of spring such as a coil spring, a torsion spring, a cantilever spring, a volute spring, a tension spring, a leaf spring, etc. Spring 52 may be formed using any suitable materials. As one example, spring 52 may be formed from stainless steel.

In the FIG. 3 example, spring 52 has a "U" shape in which the center of spring 52 pushes against housing 18 and the outside ends spring 52 push against external plate 54 (e.g., when viewed edgewise). The "U" or "V" shape of spring 52 may bow outwardly from button mechanism 40 and toward housing 18. If desired, the direction of spring 52 may be flipped so that spring 52 bows outwardly from housing 18 and toward button mechanism 40. This is merely one example of how spring 52 may be formed. In general, spring 52 may have any suitable shape. Examples of shapes in which spring 52 may be formed include, but are not limited to, "U" or "V" shapes, "W" shapes, as well as more complex shapes. The "U" or "V" shapes illustrated in FIGS. 3 and 4 may sometimes be referred to as U-shaped or V-shaped edge profiles (e.g., spring 52 may have a U-shaped edge profile when viewed from above).

Figure 4:
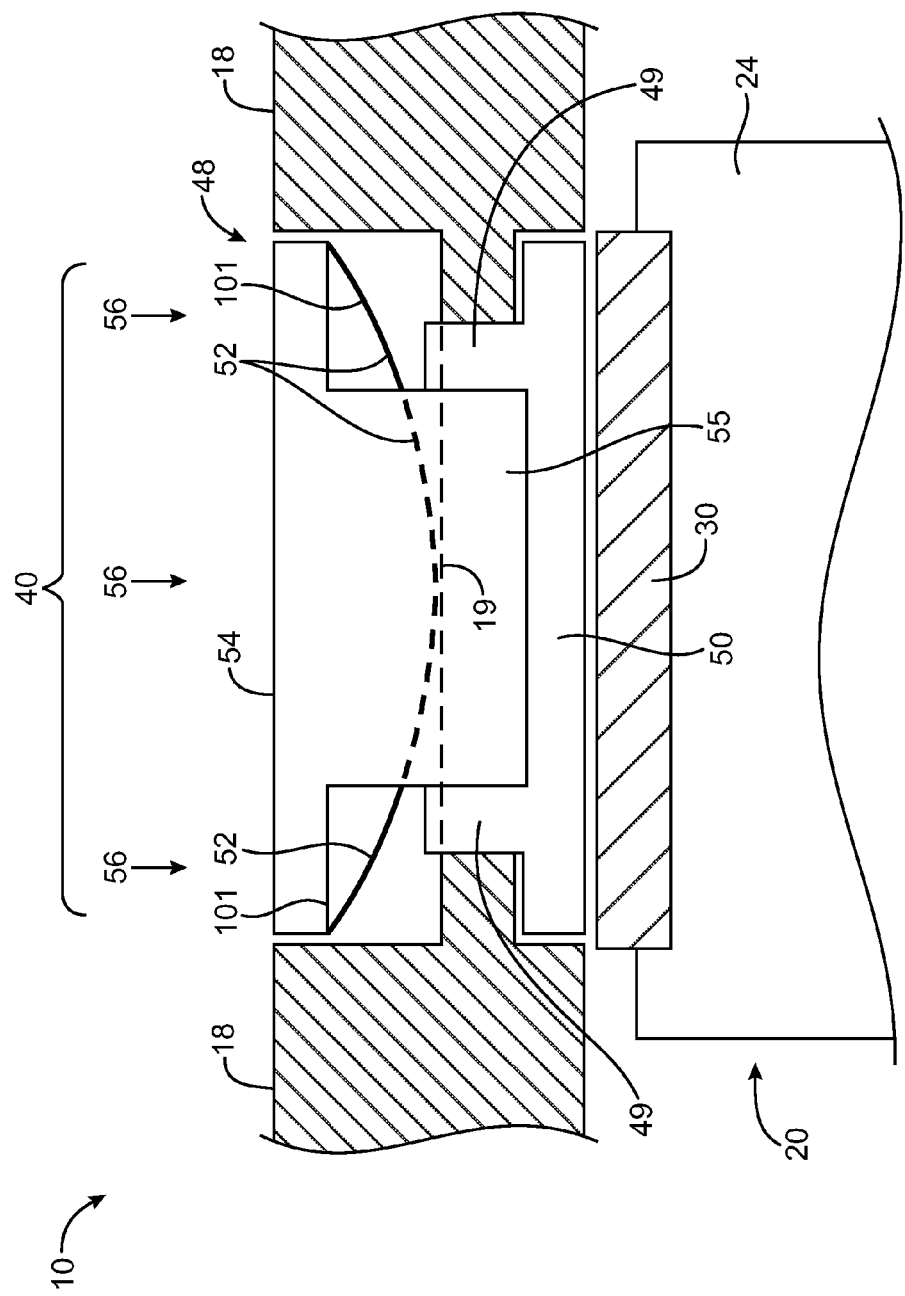
FIG. 4 is a cross-sectional side view of an illustrative button mechanism in a case that may hold an electronic device that shows how the button mechanism may transmit force between an external plate and a button in the electronic device in accordance with an embodiment of the present invention.

A cross-sectional view of button mechanism 40 is shown in FIG. 4. In the example of FIG. 4, retaining plate 50 includes female press-fit member 49 and external plate 54 includes male press-fit member 55 which mates with member 49 of plate 50. Spring 52 (e.g., center portions of spring 52) may press inward against housing 18 at portion 19 of housing 18 and may press outward against member 54 (e.g., on surface 101).

As shown in FIG. 4, when device 20 is mounted within case 10, a user may actuate button 30 by pressing external plate 54. Button mechanism 40 may be configured so that button 30 can be actuated if force is received from any one of directions 56.

Figure 5:
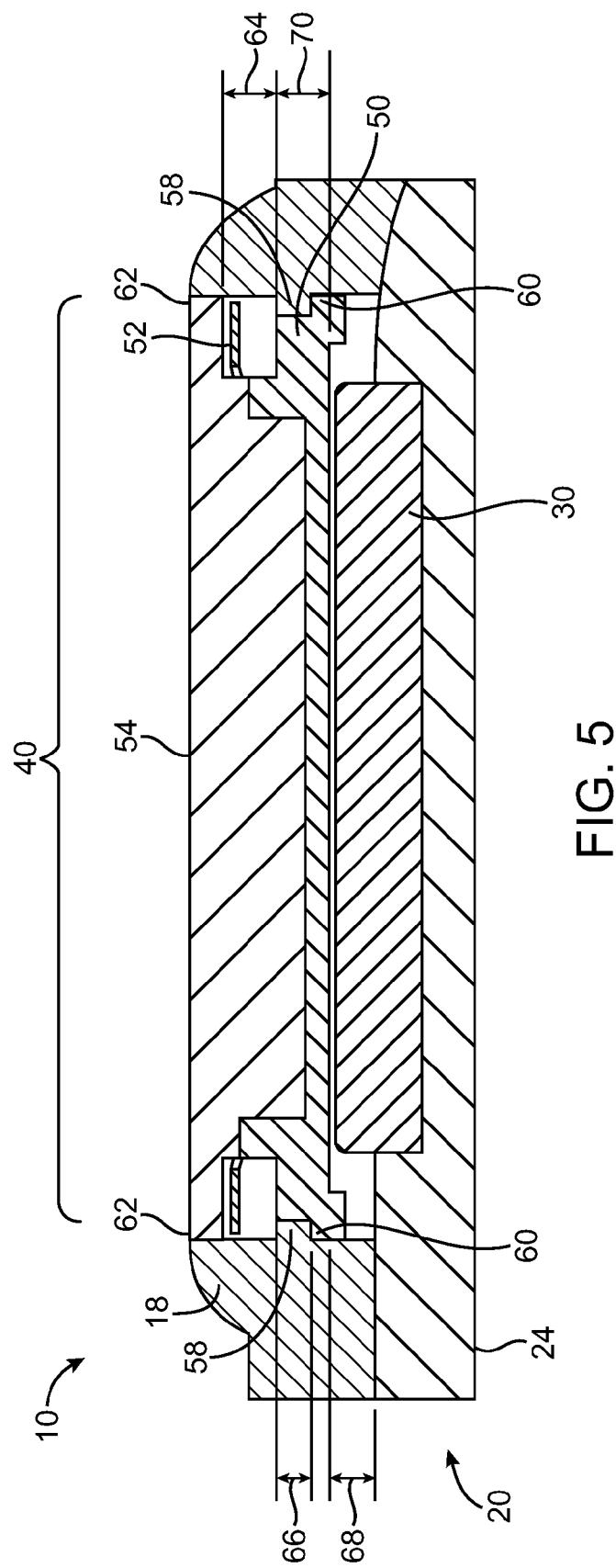
FIG. 5 is a cross-sectional side view of an illustrative button mechanism in a case that may hold an electronic device that shows how the button mechanism may include a retaining plate with a female-press-fit engaging member and an external plate with a male-press-fit engaging member that couples to the retaining plate in accordance with an embodiment of the present invention.

A second cross-sectional view of button mechanism 40 is shown in FIG. 5. As shown in the FIG. 5 example, retaining plate 50 may have portions 60 that bear against a lip such as lip 58 of housing 18 (e.g., lip 58 may form a stop structure that limits outwards travel of button mechanism 40). When button mechanism 40 is depressed (e.g., in position 42 illustrated in FIG. 1), portions 62 of external plate (and/or spring 52) may bear against portions of housing 18 such as lip 58. With this type of arrangement, portions 60 of retaining plate 50 and portions 62 of external plate 54 may help to retain button mechanism 40 within housing 18 (e.g., within hole 48 of FIG. 3). In particular, retaining plate 50 may help prevent button mechanism 40 from traveling too far outward (e.g., away from device 20) while external plate 54 may help prevent button mechanism 40 from traveling too far inward (e.g., towards device 20).

In general, button mechanism 40 and its components may have any suitable dimensions. The available travel of button mechanism 40 (e.g., the distance between its extended position and its depressed position illustrated by position 42 of FIG. 1) may be equal to dimension 64. Dimension 64 may be approximately 0.50 mm (as one example). The thickness of lip 58 of housing 18 may be equal to dimension 66. Dimension 66 may be approximately 0.50 mm (as one example). The separation between the bottom of retaining plate 50 and housing 24 of device 20 equal to dimension 68. Dimension 68 may be approximately 0.55 mm (as one example). If desired, there may be a small gap of approximately 0.05 mm between the top of button 30 of device 20 and the bottom of retaining plate 50. Alternatively, the top of button 30 and the button of retaining plate 50 may bear against each other even when button mechanism 40 is not depressed. The vertical distance from the bottom of retaining plate 50 to the top of lip 58 of housing 18 of case 10 may be equal to dimension 70. Dimension 70 may be approximately 0.65 mm (as one example).

Figure 6:
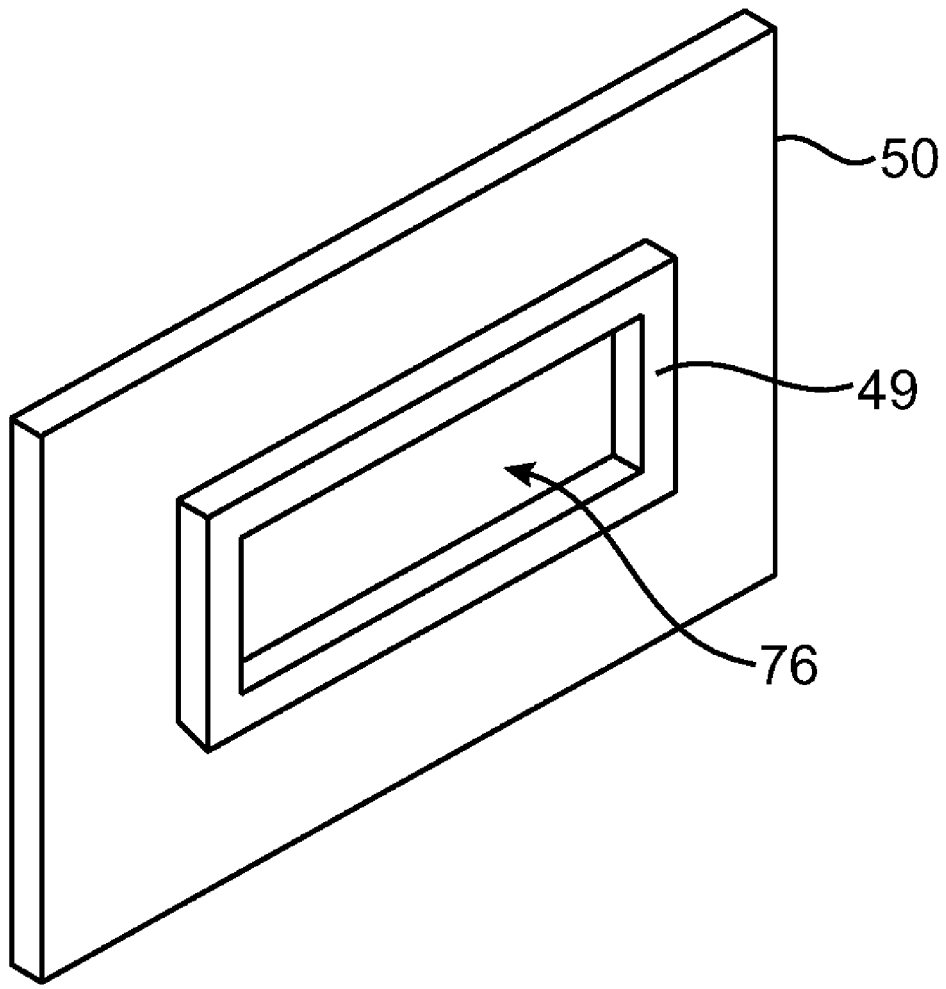
FIG. 6 is a perspective view of an illustrative retaining plate that may be a part of a button mechanism in a case and that may have a female press-fit member in accordance with an embodiment of the present invention.

A perspective view of retaining plate 50 is shown in FIG. 6. As illustrated by FIG. 6, female press-fit member 49 of plate 50 may be formed as a continuous ring-like lip or wall structure that defines a cavity such as cavity 76. While member 49 of plate 50 is shown as having a rectangular shape in the FIG. 6 example, this is merely one example. In general, press-fit member 49 may be formed in any suitable shape. As examples, member 49 may be circular, triangular, pentagonal, or polygonal. In general, member 49 may be formed using any suitable random or patterned shape.

Figure 7:
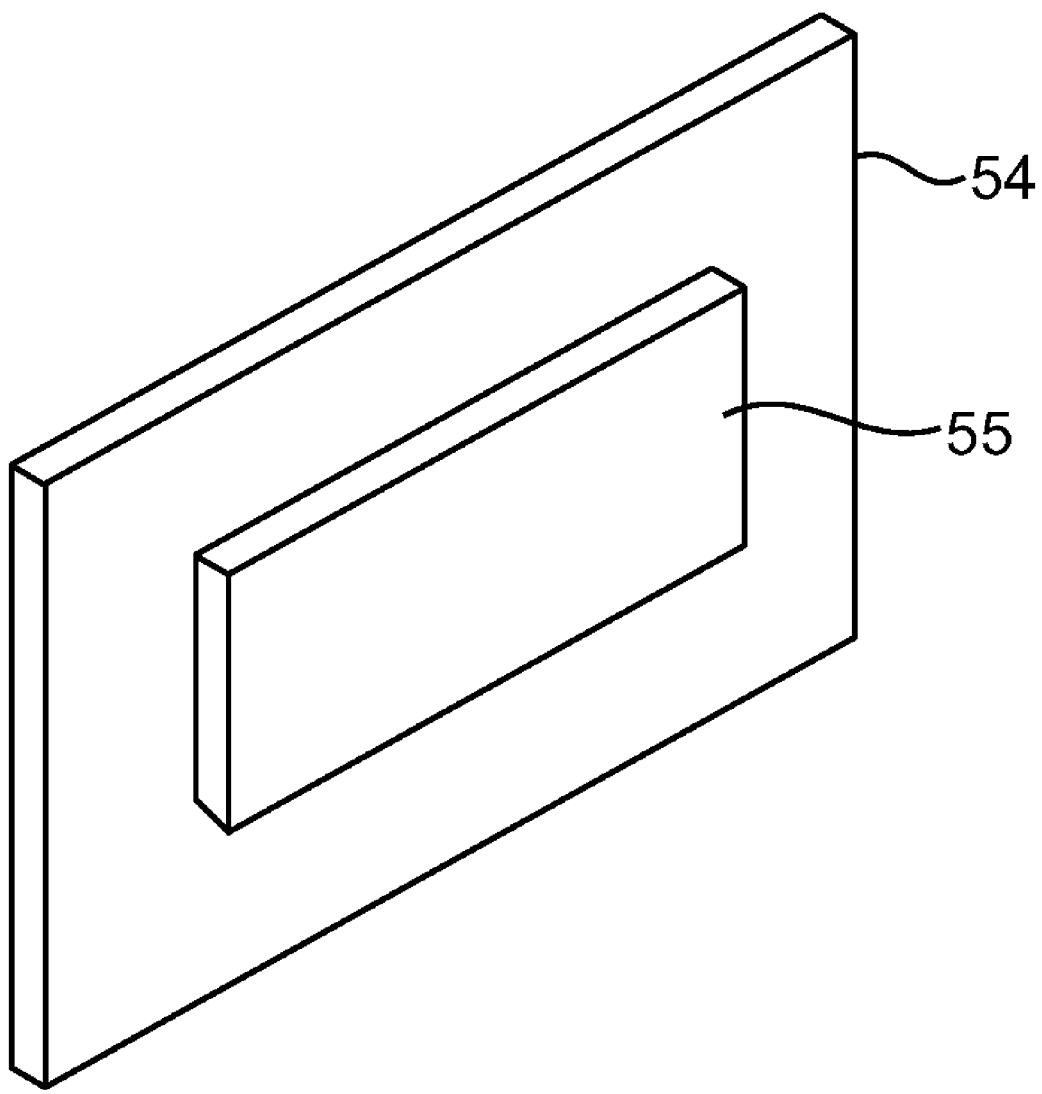
FIG. 7 is a perspective view of an illustrative external plate that may be a part of a button mechanism in a case and that may have a male press-fit member in accordance with an embodiment of the present invention.

External plate 54 is illustrated in perspective in FIG. 7. As shown in FIG. 7, external plate 54 may include male press-fit member 55. Male press-fit member 55 may be formed as a single structure extending out from external plate 54, as shown in FIG. 7. When external plate 54 is joined with retaining plate 50, member 55 may fill cavity 76 of member 49. Member 55 may be formed using any suitable shape. In general, it is necessary to match the shape of member 55 and the shape of member 49 of retaining plate 50 such that members 49 and 55 function as press-fit members.

Figure 8:
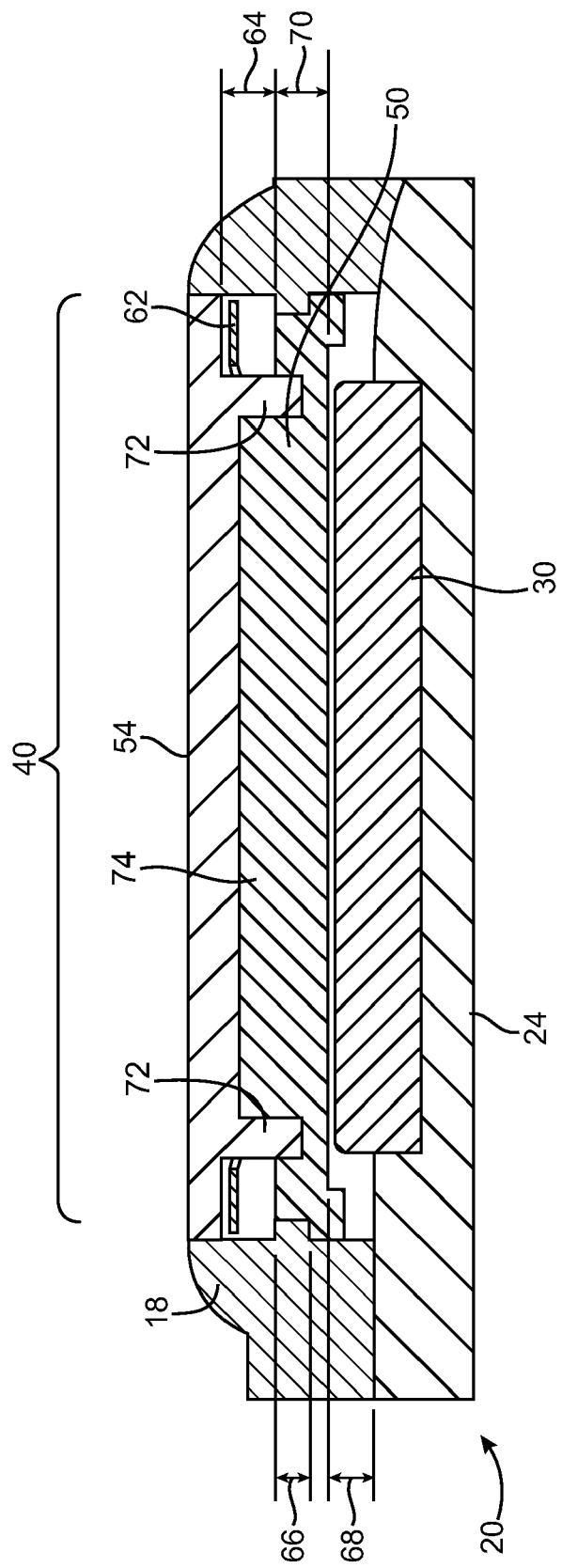
FIG. 8 is a cross-sectional side view of an illustrative button mechanism in a case that may hold an electronic device that shows how the button mechanism may include a retaining plate with a male-press-fit member and an external plate with a female-press-fit member that couples to the retaining plate in accordance with an embodiment of the present invention.

As shown in the cross-sectional view of button mechanism 40 of FIG. 8, retaining plate 50 may include male press-fit member 74. External plate 54 may include a member such as female press-fit member 72 that mates with member 74 of plate 50. This is merely an example of how retaining plate 50 and external plate 54 may be held together. Other attachment mechanisms may be used, if desired.

Figure 9:
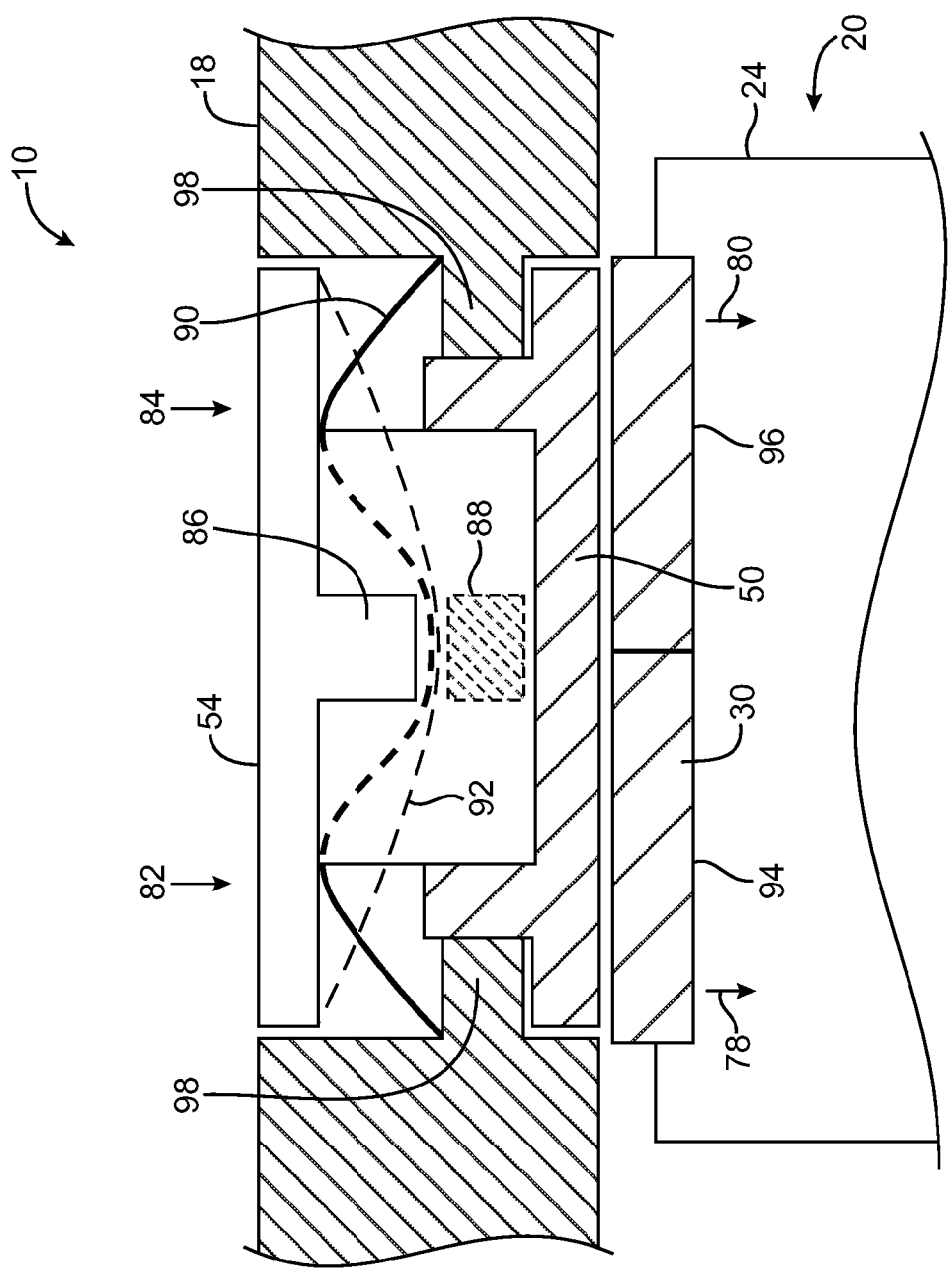
FIG. 9 is a cross-sectional side view of an illustrative button mechanism in a case that may hold an electronic device that shows how the button mechanism may transmit forces between an external plate and a rocker switch with two actuation modes in accordance with an embodiment of the present invention.

Button 30 of device 20 may be a rocker-type switch that has two actuation modes. To replicate this functionality in case 10, button mechanism 40 may also be configured as a rocker-type mechanism. For example, as shown in FIG. 9, button 30 may have a first actuation mode in which portion 94 of button 30 is depressed (e.g., button 30 rocks in direction 78) and may have a second actuation mode in which portion 96 of button 30 is depressed (e.g., button 30 rocks in direction 80). This type of a button arrangement may be used to provide a volume button with a volume up option and a volume down option (as an example). In addition, button 30 may have a third actuation mode in which the entire button is depressed (e.g., portions 94 and 96 are both depressed simultaneously).

Housing 18 may include stop members 98. Housing 18 may include optional stops 88. External plate 54 may include a member such as member 86 that bears against optional stops 88. With one suitable arrangement, optional stops 88 may act as a fulcrum for button mechanism 40. For example, when a user presses on external plate 54 in direction 84, member 86 of external plate 54 may bear against stops 88 and external plate 54 may pivot such that portion 96 of button 30 is depressed by button mechanism 40 while portion 94 of button 30 is not depressed. Similarly, when a user presses on external plate 54 in direction 82, external plate 54 may pivot the fulcrum created by stops 88 such that portion 94 of button 30 is depressed while portion 96 remains undepressed. Stops 98 may help to hold button mechanism within housing 18. For example, stops 98 may prevent retaining plate 50 from moving too far away from device 20 and may also prevent external plate 54 from moving too close to device 20.

As illustrated in the FIG. 9 example, button mechanism 40 may include one or more springs such as springs 90 and 92. Spring 90 may be a "W" shaped spring with end portions that bear against housing 18, with center portions that bear against stops 88 of housing 18, and with portions that bears against external plate 54. Spring 92 may be a "U" or "V" shaped spring that bears against external plate 54 at each of the ends of plate 54 and that bears against stops 88 of housing 18. With another suitable arrangement, spring 92 maybe inverted such that the center of the spring bears against the center of external plate 54 and the outside ends of the spring bear against stops 98 of housing 18. The "W" shapes illustrated in FIGS. 9 and 10 may sometimes be referred to as a W-shaped edge profiles (e.g., springs 90 and 92 may have a W-shaped edge profile when viewed from above). These are merely illustrative examples and, in general, any suitable spring or combinations of springs may be used in button mechanism 40.

Figure 10:
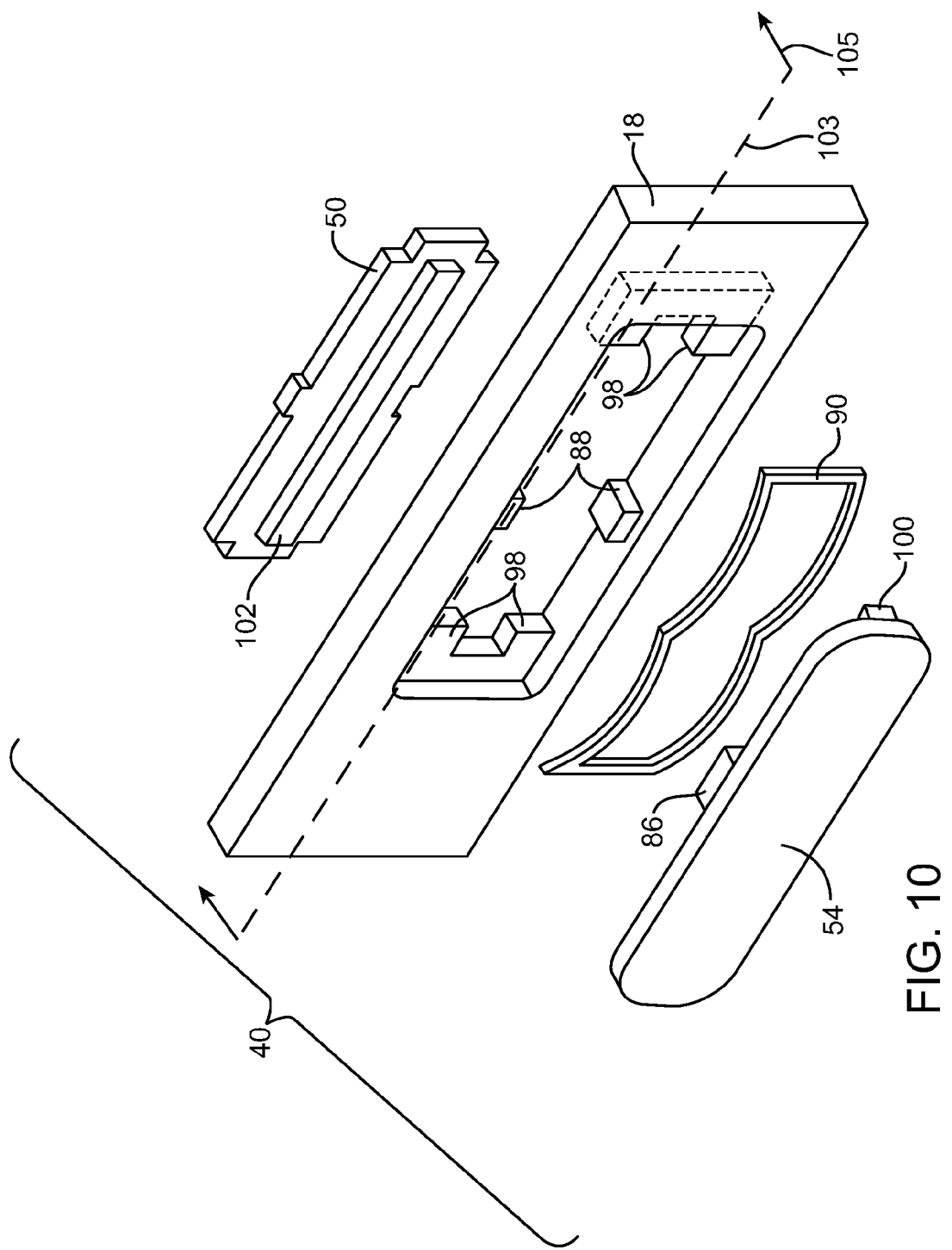
FIG. 10 is an exploded perspective view of an illustrative portion of a case that may hold an electronic device and a button mechanism that may be part of the case and that may transmit forces between an external plate and a rocker switch with two actuation modes in the electronic device in accordance with an embodiment of the present invention.

An exploded perspective view of the FIG. 9 embodiment of button mechanism 40 is shown in FIG. 10. As shown in the FIG. 10 example, external plate 54 may have a female press-fit member 100 (e.g., a press-fit member similar to press-fit member 49 of the FIG. 6 example) and retaining plate 50 may have a male press-fit member 102 (e.g., a press-fit member similar to press-fit member 55 of the FIG. 7 example). If desired, external plate 54 may have one or more male press-fit members and retaining plate 50 may have one or more corresponding female press-fit members.

FIG. 10 also illustrates that housing 18 may include a pair of stops 88 and that stops 88 may extend past stops 98. In particular, the outside surfaces of stops 88 may be closer to the outside surface of housing 18 than the outside surfaces of stops 98. This type of arrangement may help button mechanism 40 pivot on stops 88 while stops 98 prevent external plate 54 from traveling too far (e.g., moving too close to device 20).

The cross-sectional view in FIG. 9 of the assembled button mechanism of case 10 is taken in direction 105 of FIG. 10 along cross-sectional line 103 of FIG. 10.

The foregoing is merely illustrative of the principles of this invention and various modifications can be made by those skilled in the art without departing from the scope and spirit of the invention.

What is claimed is:

1. A removable case for an electronic device that has a button, comprising:
   a housing into which the electronic device is removably inserted, wherein the housing has portions defining a hole;
   a button mechanism mounted in the hole, wherein the button mechanism has a given portion that bears against the button in the electronic device when the button mechanism is actuated by a user; and
   a sheet spring that biases the button mechanism away from the button in the electronic device, wherein the housing has inner surface regions that surround the hole and wherein, when the button mechanism is not being actuated by the user, the given portion of the button mechanism is approximately flush with the inner surface regions of the housing.

2. The removable case defined in claim 1 wherein the button mechanism comprises a first member having a first press-fit engagement feature and a second member having a second press-fit engagement feature, wherein the first and second press-fit engagement features are coupled together.

3. The removable case defined in claim 1 wherein the button mechanism comprises a retaining member that has a female press-fit structure and an external member that has a male press-fit structure and wherein the female and male press-fit structures are connected together through the hole.

4. The removable case defined in claim 3 wherein the retaining member comprises a substantially rectangular metal retaining member and wherein the female press-fit structure comprises a substantially rectangular protrusion from the metal retaining member that defines a cavity.

5. The removable case defined in claim 4 wherein the external member comprises a substantially rectangular metal external member and wherein the male press-fit structure comprises a substantially rectangular protrusion from the metal external member that fits within the cavity.

6. The removable case defined in claim 1 wherein the housing has a lip that extends at least partly into the hole and wherein the lip bears against portions of the button mechanism to hold the button mechanism in the hole.

7. The removable case defined in claim 1 wherein the sheet spring has a U-shaped edge profile and wherein the sheet spring has center portions that bear against the housing.

8. The removable case defined in claim 1 wherein the sheet spring has a U-shaped edge profile and wherein the sheet spring has center portions that bear against the button mechanism.

9. The removable case defined in claim 1 wherein the sheet spring has a W-shaped edge profile and wherein the sheet spring has end portions that bear against the housing.

10. The removable case defined in claim 1 wherein the sheet spring has a W-shaped edge profile and wherein the sheet spring has end portions that bear against the button mechanism.

11. The removable case defined in claim 1 wherein the button mechanism comprises a plurality of planar stainless steel members.

12. A removable case for an electronic device that has a rocker button having a first portion and a second portion, comprising:
   a housing into which the electronic device is removably inserted, wherein the housing has portions defining a hole;
   a pivoting button mechanism mounted in the hole, wherein the pivoting button mechanism bears against one of the first and second portions of the rocker button in the electronic device when the pivoting button mechanism is actuated by a user; and
   a spring that biases the pivoting button mechanism away from the button in the electronic device such that the pivoting button mechanism is retracted into the housing and does not scrape against the electronic device as the electronic device is removably inserted into the housing.

13. The removable case defined in claim 12 wherein the spring comprises a sheet spring member that has a W-shaped edge profile.

14. The removable case defined in claim 12 wherein the housing comprises first and second stop members and a fulcrum member and wherein the first and second stop members and the fulcrum member extend into the hole.

15. The removable case defined in claim 14 wherein the pivoting button mechanism comprises a member that, when the pivoting button mechanism is actuated by the user, bears against the fulcrum member so that the pivoting button mechanism pivots about the fulcrum member and bears against one of the first and second portions of the rocker button in the electronic device when the pivoting button mechanism is actuated by the user.

16. The removable case defined claim 12 wherein the housing has an elongated rectangular shape with an opening at one end that is configured so that the electronic device is removably inserted into the housing by sliding the electronic device into the housing through the opening.

17. A removable case for an electronic device that has a button, comprising:
   a housing into which the electronic device is removably inserted, wherein the housing has portions defining a hole; and
   a button mechanism mounted in the hole, wherein the button mechanism has given portions that bear against the button in the electronic device when the button mechanism is actuated by a user, wherein the button mechanism comprises first and second opposing metal plates connected together through the hole, wherein the housing has surface regions that lie in a first plane, that surround the hole, and that are adjacent to the electronic device when the electronic device is inserted into the housing, wherein, when the button mechanism is not being actuated by the user, the given portions of the button mechanism lie in a second plane, and wherein the first plane is between the second plane and the electronic device, when the electronic device is being removably inserted into the housing.

18. The removable case defined in claim 17 wherein the first and second metal plates each comprise a press-fit engagement member.

19. The removable case defined in claim 17 wherein the button in the electronic device is a rocker button having a first portion and a second portion, wherein the button mechanism comprises a pivoting button mechanism that bears against one of the first and second portions of the rocker button in the electronic device when the pivoting button mechanism is actuated by the user, and wherein the first metal plate comprises an external surface and wherein the second metal plate comprises a surface that bears against the rocker button in the electronic device.

20. The removable case defined in claim 17 further comprising a spring having a W-shaped edge profile that biases the button mechanism away from the button in the electronic device.

* * * * *